US008837051B1

(12) United States Patent
Olczak (10) Patent No.: US 8,837,051 B1
(45) Date of Patent: Sep. 16, 2014

(54) HEAD MOUNTED DISPLAY WITH A ROOF MIRROR ARRAY FOLD

(75) Inventor: Eugene Olczak, Pittsford, NY (US)

(73) Assignee: Exelis, Inc., Mclean, VA (US)

( * ) Notice: Subject to any disclaimer, the term of this patent is extended or adjusted under 35 U.S.C. 154(b) by 82 days.

(21) Appl. No.: 13/453,295

(22) Filed: Apr. 23, 2012

(51) Int. Cl.
*G02B 27/14* (2006.01)

(52) U.S. Cl.
USPC .......................................... 359/630

(58) Field of Classification Search
USPC ................................. 359/630–633
See application file for complete search history.

(56) References Cited

U.S. PATENT DOCUMENTS 5,418,584 A * 5/1995 Larson .......................... 353/122
7,952,059 B2 * 5/2011 Vitale et al. ................. 250/208.1
2003/0156260 A1 * 8/2003 Putilin et al. ..................... 353/10

OTHER PUBLICATIONS

Rolland-Thompson, Kevin and Jannick; McGuire, James P.; Cakmakci, Ozan, and Thomson, Brian J.; "The Coming Generation of Head-Worn Displays (HWDs)", Optical Society of America, 2009 Annual Meeting, San Jose, CA.

* cited by examiner

*Primary Examiner* — James Jones
(74) *Attorney, Agent, or Firm* — RatnerPrestia

(57) ABSTRACT

The present invention includes a head mounted display (HMD) worn by a user. The HMD includes a display projecting an image through an optical lens. The HMD also includes a one-dimensional retro reflective array receiving the image through the optical lens at a first angle with respect to the display and deflecting the image at a second angle different than the first angle with respect to the display. The one-dimensional retro reflective array reflects the image in order to project the image onto an eye of the user.

19 Claims, 12 Drawing Sheets

SIDE VIEW

HEAD MOUNTED DISPLAY WITH A ROOF MIRROR ARRAY FOLD

STATEMENT REGARDING FEDERALLY SPONSORED RESEARCH

The invention described herein was made in the performance of work under NASA Contract No. jwst-z9005-10-0005477 and is subject to the provisions of Section 305 of the National Aeronautics and Space Act of 1958 (42 U.S.C. 2457).

FIELD OF THE INVENTION

The present invention relates, in general, to a head mounted display (HMD) that includes a one-dimensional reflective array. Specifically, the present invention relates to a one-dimensional reflective array that deflects an image projected from a display onto an eye of a user wearing the HMD.

BACKGROUND

In conventional HMDs, a reflective array is utilized to reflect images to an eye of a user wearing the HMD. These reflective arrays typically include a two-dimensional reflector such as a corner cube. In general, a two-dimensional reflective array reflects the image back to the point of origin in both a horizontal axis and a vertical axis.

In order to fold the image away from the point of origin (i.e. the source), conventional HMDs implement a beam splitter which allows the reflected image to pass through the splitter and onto the eye of the user. This additional beam splitter results in a more complicated, bulky and expensive HMD.

SUMMARY

To meet this and other needs, and in view of its purposes, the present invention provides a head mounted display (HMD) worn by a user. In one embodiment, the HMD includes a display for projecting an image through an optical lens, a reflective array that retro-reflects along one axis (herein referred to as a one-dimensional retro reflective array) for receiving the image through the optical lens at a first angle with respect to the display, and deflecting the received image at a second angle different than the first angle with respect to the display to project the image onto an eye of a user.

The HMD may also include a real world optical lens for receiving a real world image and transmitting the real world image through the one-dimensional retro reflective array onto the eye of the user. In an embodiment, the one-dimensional retro reflective array deflects the received image in a first axis and reflects the received image in a second axis perpendicular to the first axis. In another embodiment, the one-dimensional retro reflective array is coated with a partially reflective material and is sandwiched between dielectric layers having matching indices of refraction.

In another embodiment, the one-dimensional retro reflective array is coated with partially reflective material to perform selective reflection and transmission based on at least one of light polarization and light wavelength. In an embodiment, the one-dimensional retro reflective array is tilted in one axis with respect to the display to deflect the received image away from the display and onto the eye of the user.

In another embodiment, the one-dimensional retro reflective array includes a plurality of reflective vertical micro-prisms extending parallel to each other along the reflective array in a vertical axis. The reflective vertical micro-prisms reflecting the image in a horizontal axis onto the eye of the user.

In another embodiment, the present invention provides head mounted display (HMD) worn by a user. The HMD includes a display for projecting a virtual image, an optical lens for collimating the projected virtual image, a partially reflective one-dimensional retro reflective array for receiving the virtual image through the optical lens at a first angle in a first axis with respect to the display and at a second angle in a second axis perpendicular to the first axis with respect to the display, reflecting the received virtual image in the first axis and deflecting the received virtual image in the second axis onto an eye of the user, and receiving a real world image and transmitting the real world image through the partially reflective one-dimensional retro reflective array onto the eye of the user.

In another embodiment, the optical lens includes a combination of a plurality of optical lens elements, at least one of the plurality of optical lens elements being a non-rotationally symmetric element. The display and the plurality of optical lens elements are positioned on the HMD above the eye of the user.

In another embodiment, the plurality of lens elements include at least one of spherical, aspherical, radial basis function, polynomial and NURBS shapes. In another embodiment, the partially reflective one-dimensional retro reflective array is coated with partially reflective metal or dielectric layer.

In another embodiment, the partially reflective one-dimensional retro reflective array includes micro-prisms extending along the array in the second axis. The partially reflective one-dimensional retro reflective array is aligned with respect to the display in the first axis for reflecting the light in the first axis and tilted with respect to the display in the second axis for deflecting the light onto the eye of the user.

In another embodiment, the first axis is horizontal with respect to the eye of the user and the second axis is vertical with respect to the eye of the user. In an embodiment, the first axis is vertical with respect to the eye of the user and the second axis is horizontal with respect to the eye of the user. In another embodiment, the present invention provides a one dimensional reflector transmitting a virtual image from a head mounted display (HMD) onto an eye of a user wearing the HMD. The one dimensional reflector includes an array of reflective micro-prisms. Each micro-prism extends along the reflector in a first axis parallel with each other. Each micro-prism is configured to deflect the virtual image in the first axis and reflect the virtual image in a second axis perpendicular to the first axis to project the virtual image onto the eye of the user.

In another embodiment, the HMD is attached to a helmet worn by the user or a goggle worn by the user. In an embodiment, the array of reflective micro-prisms receive a real world image and transmit the real world image through the array and onto the eye of the user. In an embodiment, a length, width and a number of the reflective micro-prisms are determined based on dimensions of a display projecting the virtual image in the HMD. In an embodiment, the first axis is horizontal or vertical with respect to the eye of the user. In an embodiment, the array of reflective micro-prisms are coated with a partially reflective material that reflects light from the virtual image on one side of the array and transmits a real world image from another side of the array.

It is understood that the foregoing general description and the following detailed description are exemplary, but not restrictive, of the invention.

DETAILED DESCRIPTION

As will be described, the example embodiments provide a head mounted display (HMD) system for projecting light (e.g. an image) onto an eye of a user wearing the HMD. The HMD system may include a display for projecting an image through an optical lens, and a one-dimensional retro reflective array for receiving and deflecting the projected image onto the eye of the user. A benefit of the one-dimensional retro reflective array is to provide an approximation to pupil re-imaging without the use of a bulky field lens or relay.

In general, the one-dimensional reflective array reflects the light from the projected image in one axis while deflecting the light in a second perpendicular axis (e.g., horizontal axis and vertical axis). By including a one-dimensional retro reflective array in the HMD, an additional beam splitter is not required.

Figure 1:
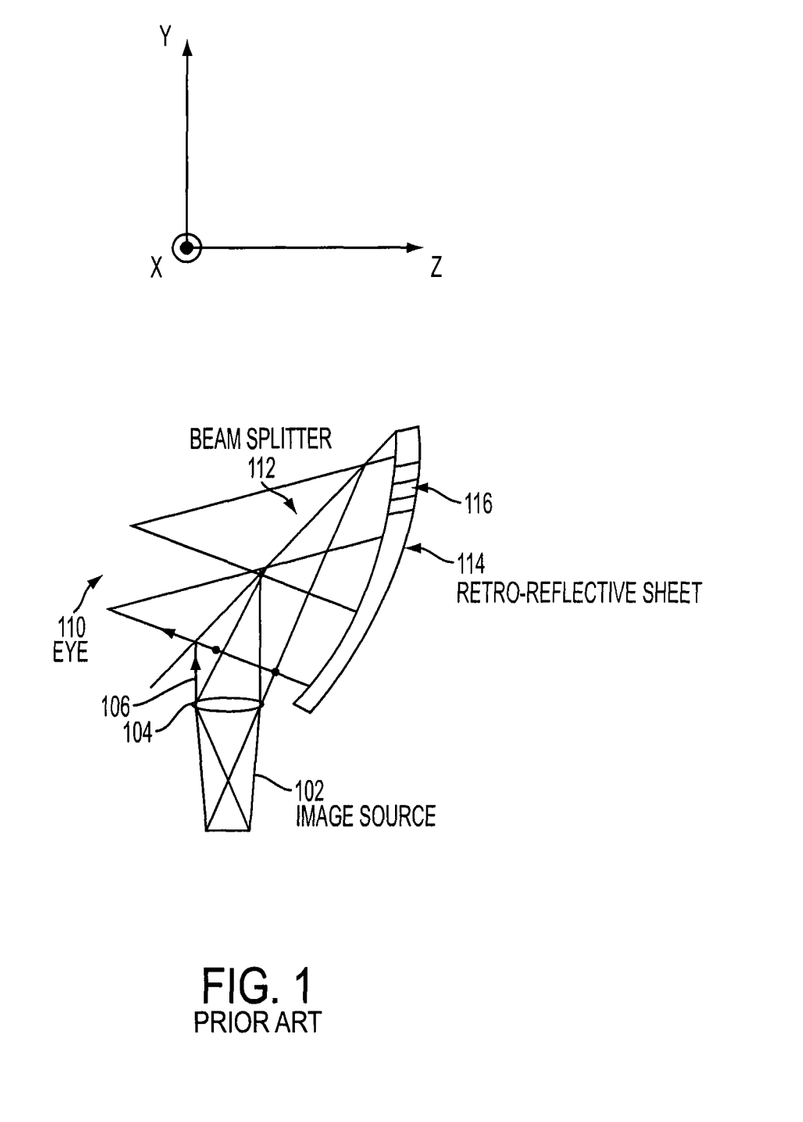
FIG. 1 is a side view of an HMD with a two-dimensional reflective array, according to the prior art.

As shown in FIG. 1, a conventional HMD may include a two-dimensional reflective array 114. A display (not shown) may project light beam 102 (e.g. an image) through an optical lens 104 resulting in collimated image 106 that is reflected off of beam splitter 112 and onto the reflective array 114.

Since the conventional two-dimensional reflective array 114 includes a grid of a plurality corner cubes 116, the image is reflected directly back through the beam splitter and onto the eye 110 of the user (i.e., the image is reflected directly back towards its source).

Figure 2:
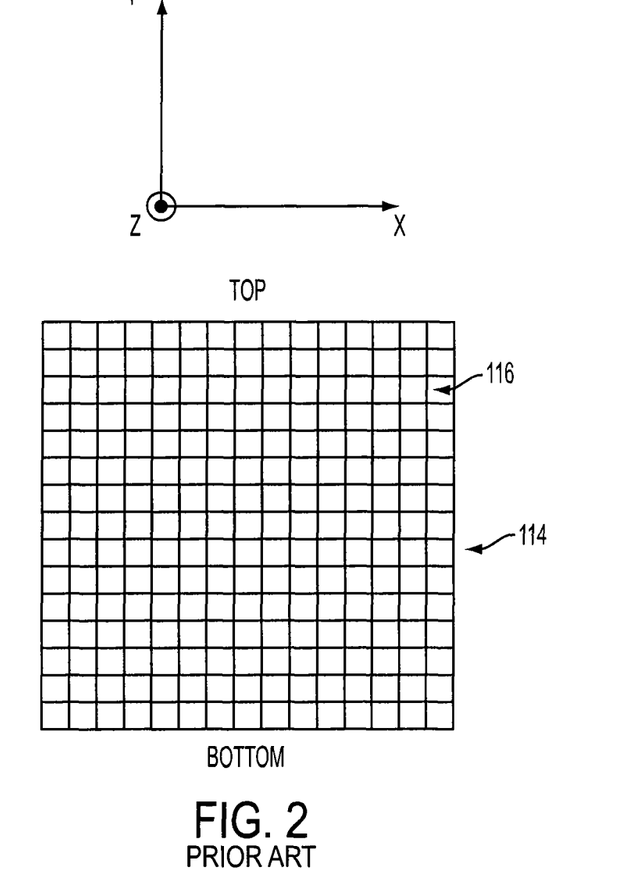
FIG. 2 is a front view of the reflective array in FIG. 1, according to the prior art.

A front view of the conventional two-dimensional reflective array 114 is shown in FIG. 2 where a grid of corner cubes 116 provide reflection of the light in both the vertical axis Y and horizontal axis X. Reflection in both dimensions ensures that the light reflects directly back in the direction from where it was projected.

Figure 3:
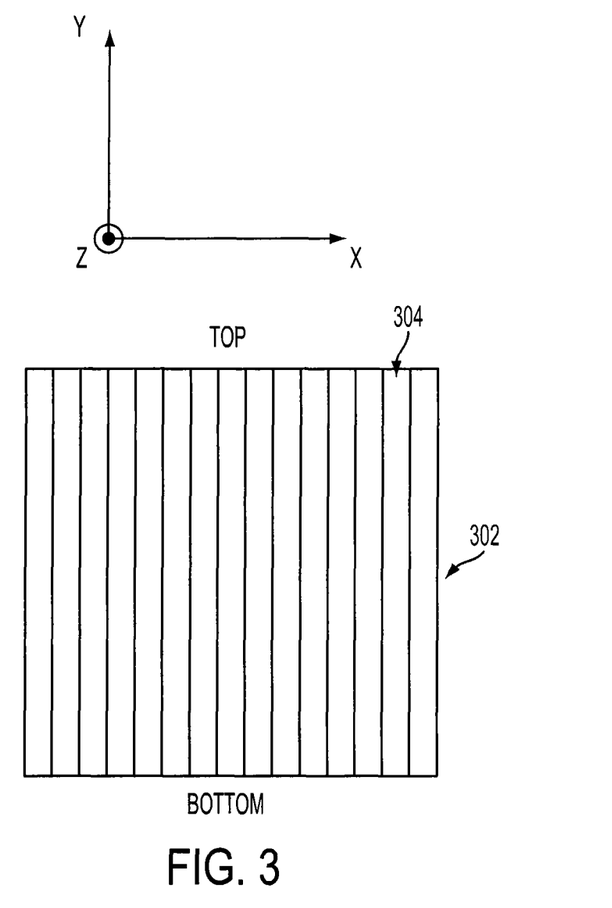
FIG. 3 is a front view of a one-dimensional reflective array, according to an embodiment of the present invention.

In an embodiment of the present invention, the HMD is designed with a one-dimensional retro reflective array 302 (as shown in FIG. 3) which includes a plurality of micro-prisms 304 extending parallel to each other along vertical axis Y. It is noted that the length, width, number and angle of the reflective micro-prism may be determined based on dimensions of a display and other components in the HMD system.

Figure 4:
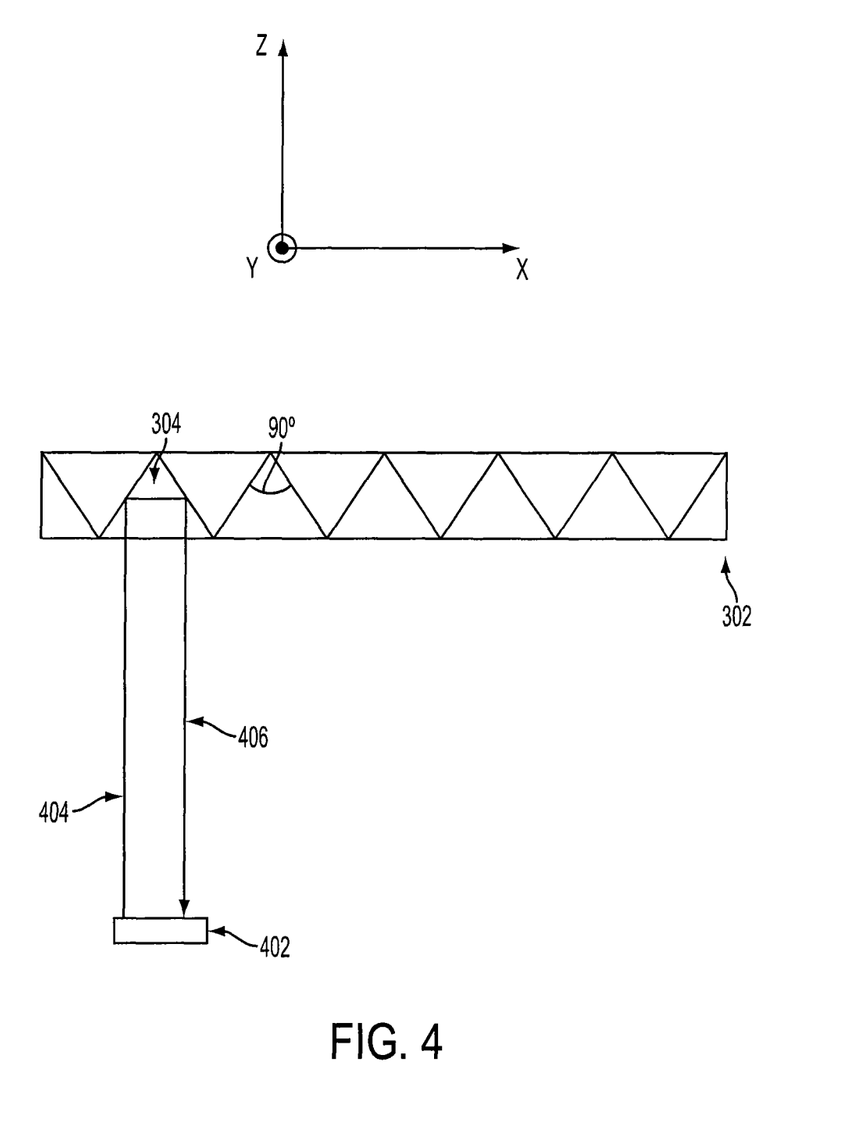
FIG. 4 is a top view (i.e. the cross-section) of the one-dimensional reflective array shown in FIG. 3, according to an embodiment of the present invention.

As shown in the cross-sectional view in FIG. 4, micro-prisms 304 of one-dimensional retro reflective array 302 are configured in a right triangular fashion which allows a light beam 406 (projected from display 402) to reflect off two adjacent micro-prisms (positioned 90° with respect to each other) and be reflected back (light beam 406) to display 402.

This reflection ensures that the light beam is projected and reflected in one dimension (e.g. horizontal axis X) back to source display 402. The one-dimensional retro reflective array 302 as shown in FIGS. 3 and 4, however is not reflected back to display 402 in the other dimension (e.g. vertical axis Y). In the vertical axis, light beam 404 is deflected away from source 402 and onto the eye of the user. Thus, the one-dimensional retro reflective array is provided for a one-dimensional approximation to pupil re-imaging. This is beneficial because a beam splitter is eliminated and flexibility in packaging is increased since the deflection angle can be varied to suit the geometry of other display components.

Figure 5:
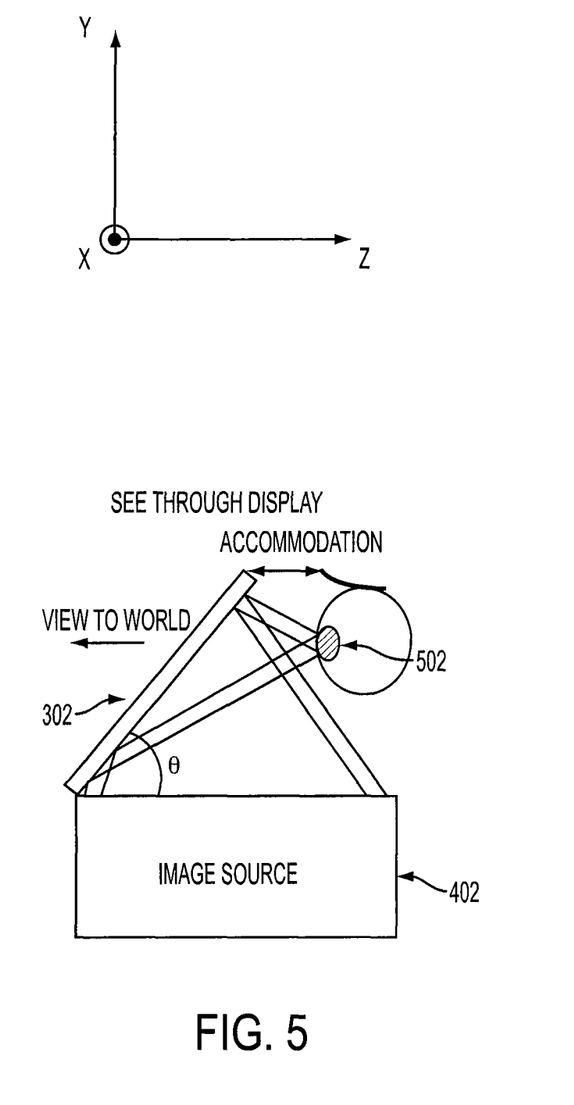
FIG. 5 is a diagram of an HMD system including a one-dimensional reflective array, according to an embodiment of the present invention.

As shown in FIG. 5, the one-dimensional retro reflective array 302 may be tilted at angle θ (i.e. rotated about the horizontal X axis) with respect to display image source 402 to perform deflection in the vertical Y axis. In one example, display 402 and one-dimensional retro reflective array 302 may be directly facing each other (i.e. oriented) about vertical Y axis (i.e. deflection may not be necessary). Retro reflective array 302, however, may be tilted away from the image source 402 resulting in the light from image source 402 being deflected away from source 402 and projected onto eye 502 of the user.

This configuration of micro-prisms 304 allows the light to be reflected in the horizontal axis while the tilt in the array allows the light to be deflected in the vertical axis. Top and side views of the system shown in FIG. 5 are also shown in FIG. 6 and FIG. 7.

Figure 6:
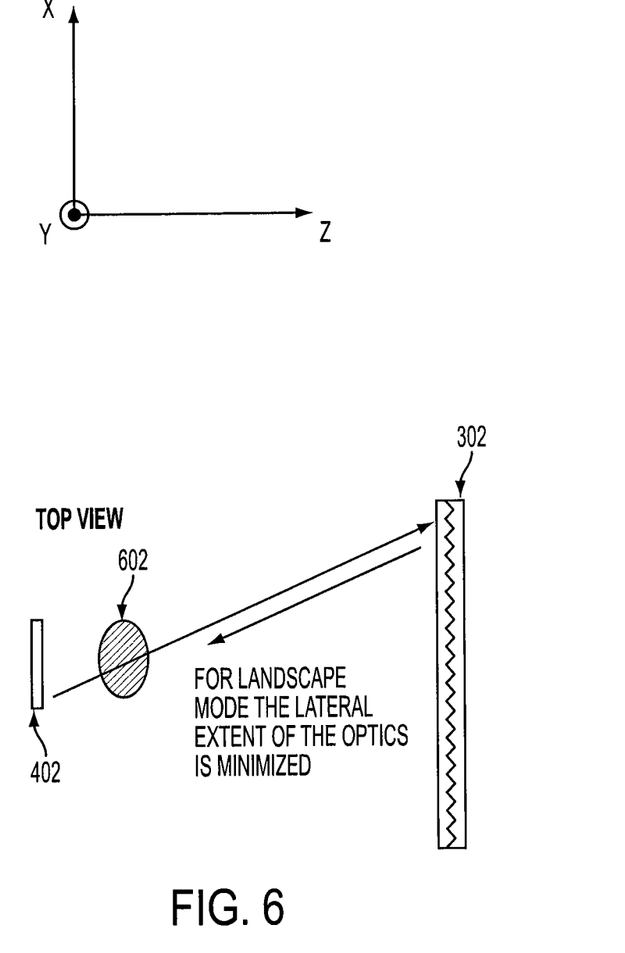
FIG. 6 is a top view of the HMD system as shown in FIG. 1, according to an embodiment of the present invention.

For example, as shown in FIG. 6, (assuming the eye of the user is below display 402 and lined up in the horizontal axis) the image projected from display 402 is reflected back to the eye in the horizontal axis while being deflected below the display onto the eye of the user. This deflection is due to the tilt angle θ of the one-dimensional retro reflective array 302.

Figure 7:
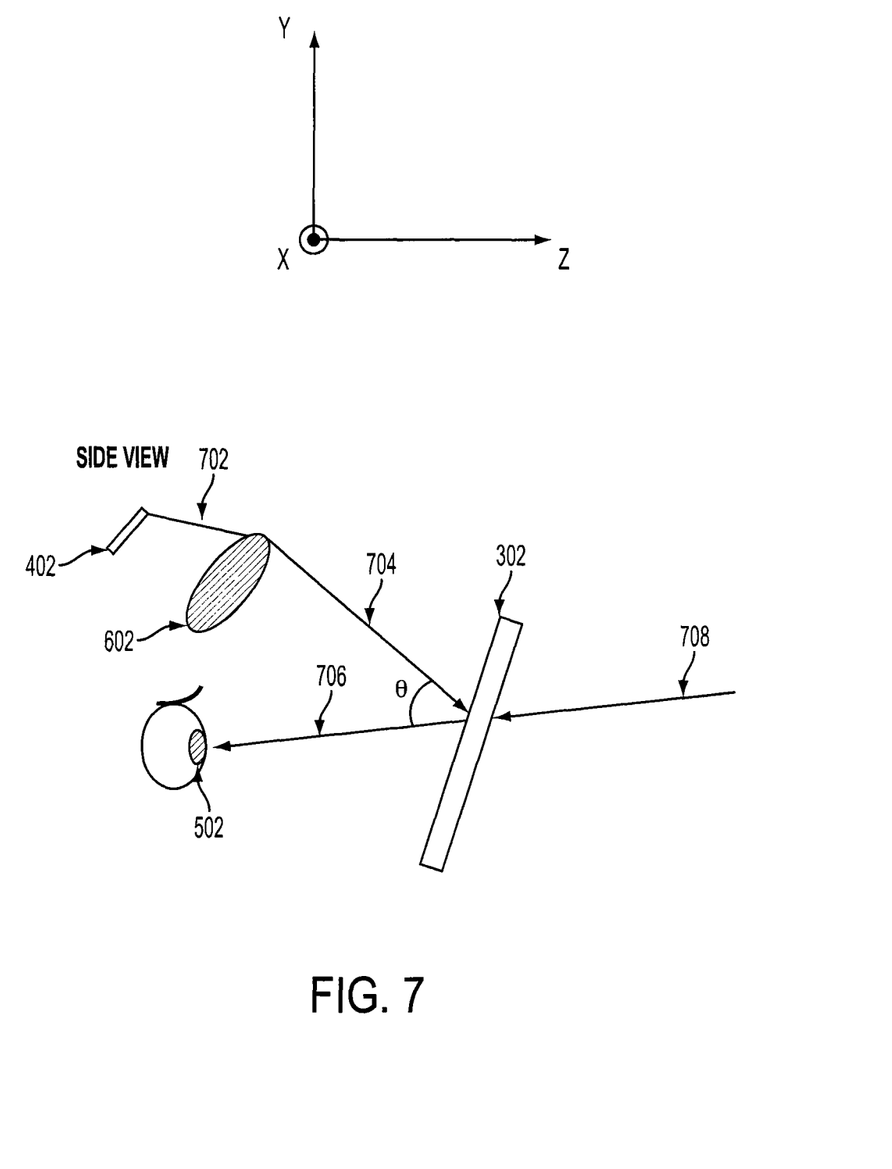
FIG. 7 is a detailed view of the HMD system shown in FIG. 5, according to an embodiment of the present invention.

A side view of the system is shown in FIG. 7 where the image 702 passes through optical lens 602, is projected as image 704 which then deflects at angle θ which is related to the relative angle between display 402 and one-dimensional retro reflective array 302. The deflected image 706 is then projected onto the pupil of the user's eye 502.

It is noted that the one-dimensional retro reflective array 302 may be fully reflective or partially reflective. If array 302 is partially reflective, a real world image 708 (i.e. light viewed through the HMD) may be transmitted through one-dimensional retro reflective array 302 onto the eye 502 of the user. This embodiment is an optical see-through system where a virtual image projected from display 402 and a real world image 708 are combined at the eye 502 of the user creating a mixed reality image. In one example, the virtual image may be an enhanced image of the real world image 708, or may be data relevant to the user's situation.

For example, if the user is a soldier on a battlefield, the virtual image may be information for highlighting objects on the battlefield. This virtual information is combined with the real world image of the battlefield so that the soldier can quickly identify the objects.

It is noted that display 402 may be any type of display such as an organic light emitting diode (OLED), light emitting diode (LED), light liquid crystal display (LCD) or liquid crystal on silicon (LCOS) display. Furthermore, the optic lens 602 may be a single lens or multiple lens elements that may include collimating optics, astigmatic optics, spherical lenses, aspheric lenses, radial basis function shaped lenses, polynomial shaped lenses or non-uniform rational basis spline (NURBS) shaped lenses. The lens elements may also be any combination of the above-described optics.

Furthermore, the one-dimensional retro reflective array 302 may be partially reflective or may be fully reflective depending on the application. For the partially reflective array 302, the mirror array may be immersed (i.e., sandwiched between layers of dielectric materials with nominally matching indices of refraction). Mirror surfaces may also be coated with partially reflective metal or dielectric material for broadband, wavelength selective or polarization selective light reflection and transmission.

Figure 8:
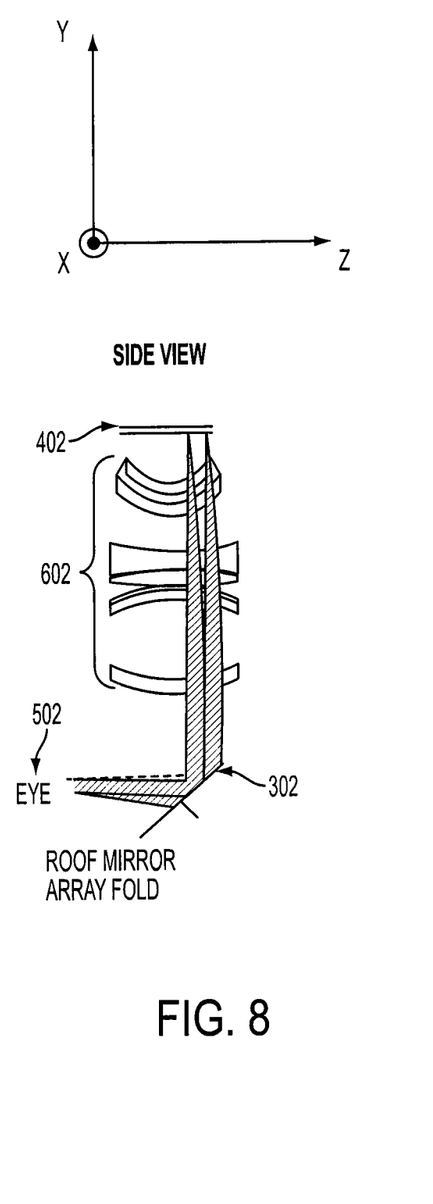
FIG. 8 is a detailed view of the HMD system as shown in FIG. 7 with a plurality of optical lens elements, according to an embodiment of the present invention.
Figure 9:
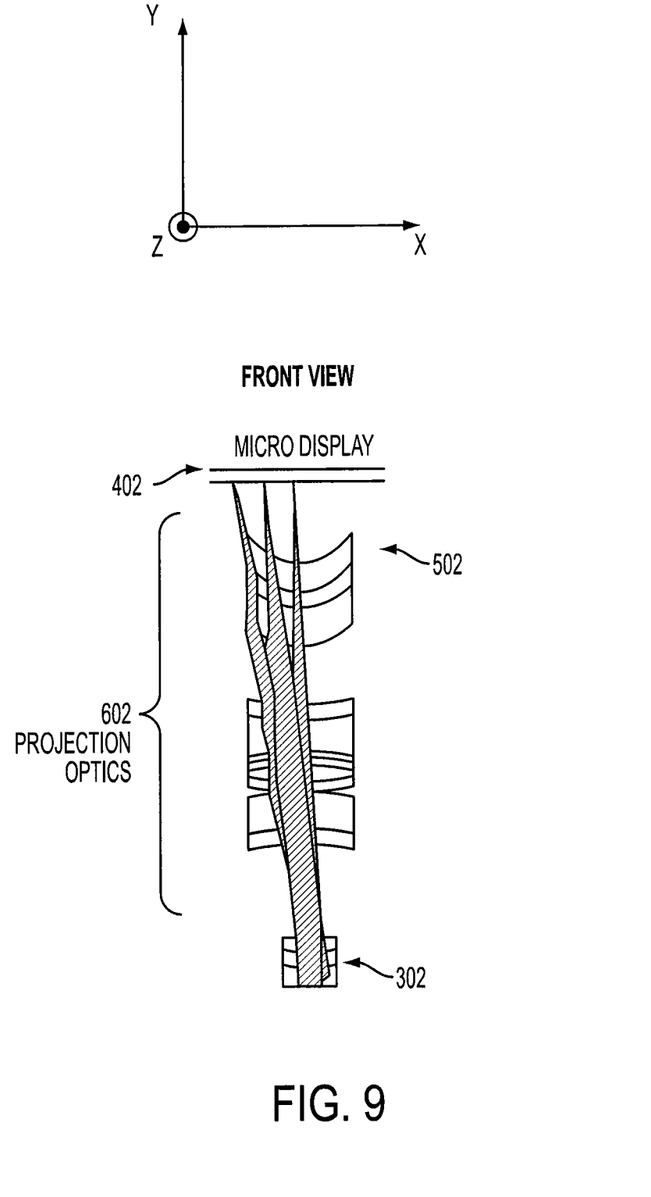
FIG. 9 is a front view of the HMD system shown in FIG. 8, according to an embodiment of the present invention.

Shown in FIG. 8, is a side view of the HMD system where lens 602 includes the combination of optical lens elements which focus the image projected from display 402 onto the eye 502 of the user. A front view of the system shown in FIG. 8 is also shown in FIG. 9. It should be noted that in the configuration shown in FIG. 8 and FIG. 9, lens elements 602 and micro display 402 may be placed above eye 502 of the user. In general, micro display 402 may be aligned with the eye of the user in the X axis and may be positioned above the user's eye in the Y axis.

It should be noted that although it shown in most of the figures that the display is above eye 502, that it may be positioned in other configurations. Specifically, the display and the optical lens elements may be positioned below or to the side of user's eye. In the side configuration, the retro reflective array 302 may be rotated 90° such that the micro-prisms are extending along the horizontal X axis. In this example, the array would be aligned with the display in the vertical Y axis and would be rotated about the horizontal X axis to deflect the image onto the eye of the user. This would ensure that the image projected from micro display 402 is reflected in the vertical axis and deflected in the horizontal axis onto user's eye 502.

Figure 10:
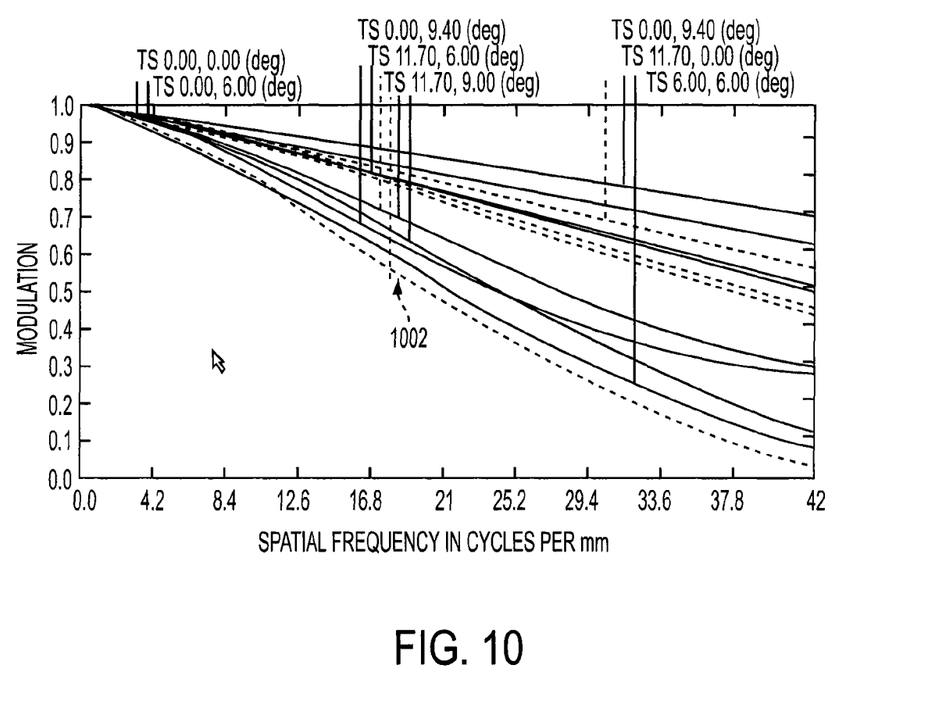
FIG. 10 is a graph of the spatial frequency versus the modulation, according to an embodiment of the present invention.
Figure 11:
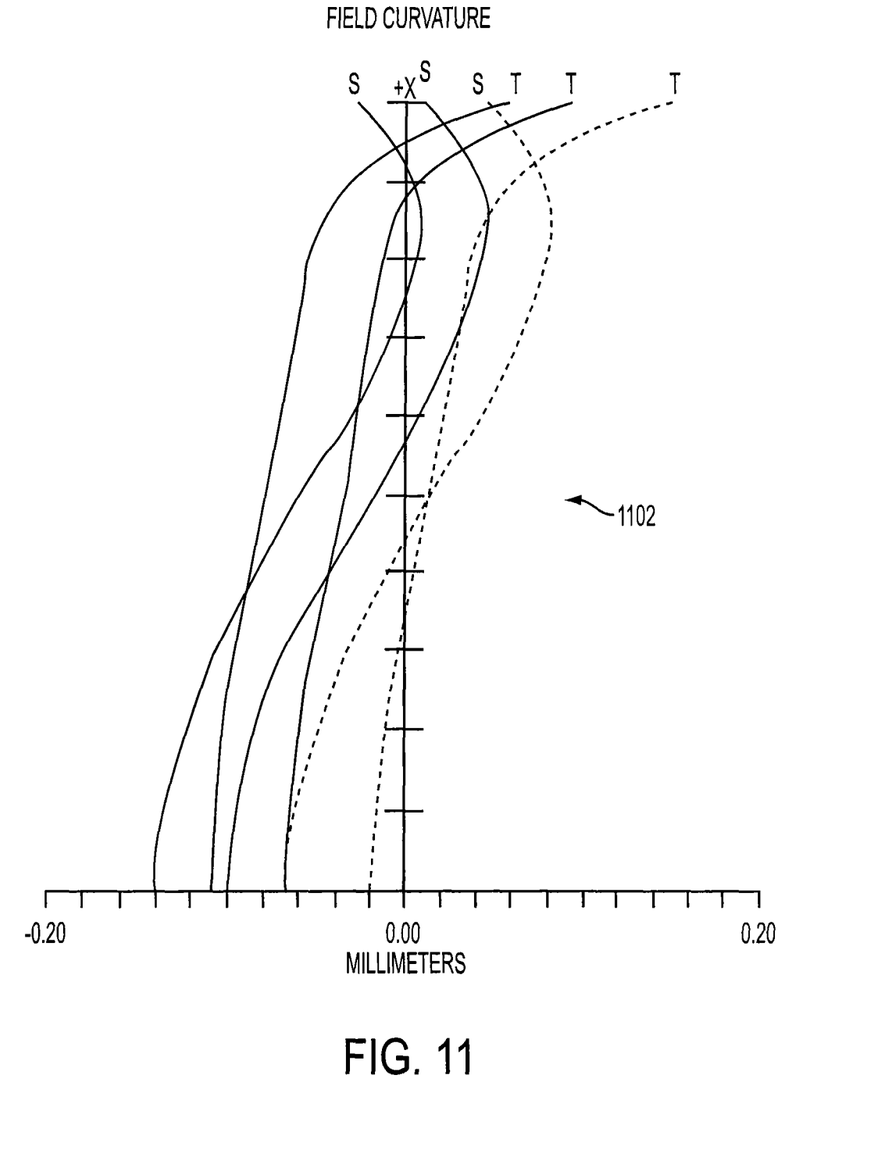
FIG. 11 is a graph of the field curvature, according to an embodiment of the present invention.
Figure 12:
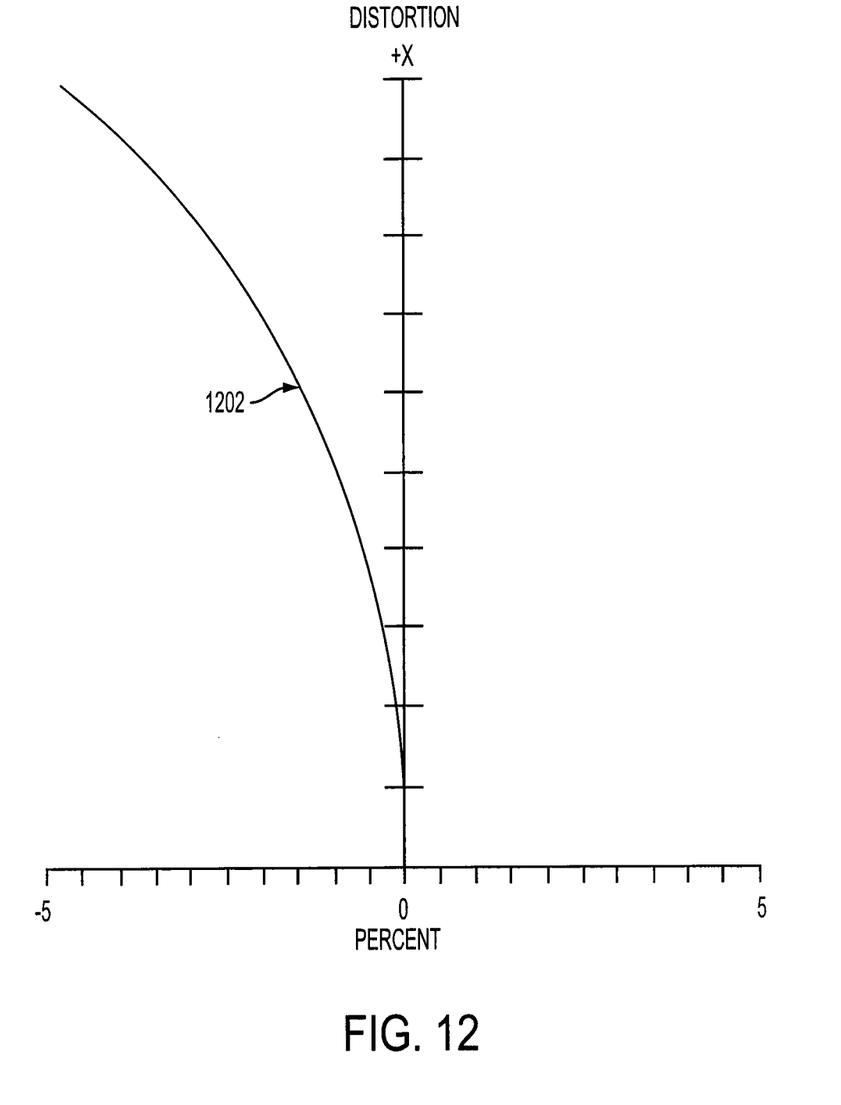
FIG. 12 is a graph of the distortion, according to an embodiment of the present invention.

Shown in FIGS. 10, 11 and 12, are simulation results for an HMD system shown in FIGS. 8 and 9 where the real world object distance is set to 3,000 mm, the pupil analysis is set at 3 mm, the eye box is set at 6 mm and there is no diopter correction across the field.

As shown in FIG. 10, according to the diffraction modulation transfer function (MTF), the spatial frequency increases as the modulation decreases. In FIG. 11, according to the field curvature plot, it is shown that the field curvature 1102 varies according to the distance from the image surface to the paraxial image surface. In FIG. 12, it is shown that the distortion 1202 is varying in response to a percentage difference between ray heights and reference ray heights.

When the display object distance is not set for infinity focus, it may be beneficial to design astigmatism into the optical lens elements to counter the anamorphic change in divergence at the one-dimensional retro reflective array. In this example, one or more elements of the optical lens elements is not rotationally symmetric. This technique is depicted in FIGS. 8 and 9.

In general, one-dimensional retro reflective array 302 may be positioned (i.e., tilted with respect to the image source and image receiver) so that the image (i.e., the light beam) is deflected in a first axis and reflected in a second perpendicular axis. This allows for the light to deflect away from the source in the first axis while maintaining alignment with the source in the second axis.

Although not shown in FIG. 7, one-dimensional retro reflective array 302 may be tilted manually or automatically. Specifically, the user may tilt the array by hand or by using a set screw. Alternatively, a server motor may be connected to array 302. The server motor (not shown) controlled by a controller (not shown) of the HMD may tilt array 302 about the X or Y axis to ensure that the image is projected onto the pupil of the user.

In the vertical configuration shown in FIG. 7, the array may be rotated about the X axis. In a side configuration (where the display is to the side of the user's eye), the array may be rotated about the Y axis.

Although the invention is illustrated and described herein in references to specific embodiments, the invention is not intended to be limited to the details shown. Rather, various modifications may be made in the details within the scope and range of equivalence of the claims and without departing from the invention.

The invention claimed is:

1. A head mounted display (HMD) worn by a user, the HMD including:
a display for projecting an image through an optical lens;
a retro reflective array configured for one-dimensional pupil re-imaging and for receiving the image through the optical lens at a first angle with respect to the display, and deflecting the received image at a second angle different than the first angle with respect to the display to project the image onto an eye of the user; and
in an X, Y, Z Cartesian coordinate system, the one-dimensional retro reflective array includes a plurality of micro-prisms, wherein each micro-prism extends uniformly in a Y-axis, and forms a right angle with an adjacent micro-prism in an X-axis, and
the retro reflective array is free-of an intermediary image.

2. The HMD of claim 1, including:
a real world optical lens for receiving a real world image and transmitting the real world image through the retro reflective array onto the eye of the user.

3. The HMD of claim 1,
wherein the retro reflective array deflects the received image in a first axis and reflects the received image in a second axis perpendicular to the first axis.

4. The HMD of claim 1,
wherein the retro reflective array is coated with a partially reflective material and is sandwiched between dielectric layers having matching indices of refraction.

5. The HMD of claim 1,
wherein the retro reflective array is coated with partially reflective material to perform selective reflection and transmission based on at least one of light polarization and light wavelength.

6. The HMD of claim 1,
wherein the retro reflective array is tilted in one axis with respect to the display to deflect the received image away from the display and onto the eye of the user.

7. A head mounted display (HMD) worn by a user, the HMD including:
a display for projecting a virtual image;
an optical lens for collimating the projected virtual image;
a partially reflective retro reflective array configured for one-dimensional pupil re-imaging and for:
a) receiving the virtual image through the optical lens at a first angle in a first axis with respect to the display and at a second angle in a second axis perpendicular to the first axis with respect to the display, b) reflecting the received virtual image in the first axis back to the display and deflecting the received virtual image in the second axis onto an eye of the user, and c) receiving a real world image and transmitting the real world image through the partially reflective retro reflective array onto the eye of the user; and in an X, Y, Z Cartesian coordinate system, the one dimensional retro reflective array includes a plurality of micro-prisms, wherein each micro-prism extends uniformly in a Y-axis, and forms a right angle with an adjacent micro-prism in an X-axis, and the retro reflective array is free-of an intermediary image.

8. The HMD of claim 7, wherein the optical lens includes a combination of a plurality of optical lens elements, at least one of the plurality of optical lens elements being a non-rotationally symmetric element, and wherein the display and the plurality of optical lens elements are positioned on the HMD above the eye of the user.

9. The HMD of claim 8, wherein the plurality of lens elements include at least one of spherical, aspherical, radial basis function, polynomial and NURBS shapes.

10. The HMD of claim 7, wherein the partially reflective retro reflective array is coated with partially reflective metal or dielectric layer.

11. The HMD of claim 7, wherein the partially reflective retro reflective array includes micro-prisms extending along the array in the second axis, and wherein the partially reflective retro reflective array is aligned with respect to the display in the first axis for reflecting the light in the first axis and tilted with respect to the display in the second axis for deflecting the light onto the eye of the user.

12. The HMD of claim 7, wherein the first axis is horizontal with respect to the eye of the user and the second axis is vertical with respect to the eye of the user.

13. The HMD of claim 7, wherein the first axis is vertical with respect to the eye of the user and the second axis is horizontal with respect to the eye of the user.

14. A reflector transmitting a virtual image from a head mounted display (HMD) onto an eye of a user wearing the HMD, the reflector including:

an array of reflective micro-prisms in the HMD, each micro-prism extending along the reflector in a first axis parallel with each other, wherein each micro-prism is configured to deflect the virtual image in the first axis and reflect the virtual image in a second axis perpendicular to the first axis to project the virtual image onto the eye of the user;

in an X, Y, Z Cartesian coordinate system, each micro-prism extends uniformly in a Y-axis, and forms a right angle with an adjacent micro-prism in an X-axis, and the reflector is free-of an intermediary image.

15. The reflector of claim 14, wherein the HMD is attached to a helmet worn by the user or a goggle worn by the user.

16. The reflector of claim 14, wherein the array of reflective micro-prisms receives a real world image and transmits the real world image through the array and onto the eye of the user.

17. The reflector of claim 14, wherein a length, a width and a number of the micro-prisms are determined based on dimensions of a display projecting the virtual image in the HMD.

18. The reflector of claim 14, wherein the first axis is horizontal or vertical with respect to the eye of the user.

19. The reflector of claim 14, wherein the array of reflective micro-prisms is coated with a partially reflective material that reflects light from the virtual image on one side of the array and transmits a real world image from another side of the array.

* * * * *